(12) United States Patent
Li et al.

(10) Patent No.: US 9,904,507 B2
(45) Date of Patent: Feb. 27, 2018

(54) METHOD AND SYSTEM FOR SYNCHRONIZING FUNCTIONS OF MUSIC PLAYER IN SMART DEVICE AND BLUETOOTH EARPHONE

(71) Applicant: HUIZHOU TCL MOBILE COMMUNICATION CO., LTD., HuiZhou, Guangdong (CN)

(72) Inventors: Wei Li, Huizhou (CN); Shaohua Liu, Huizhou (CN); Yang Sun, Huizhou (CN)

(73) Assignee: HUIZHOU TCL MOBILE COMMUNICATION CO., LTD., Huizhou, Guangdong (CN)

( * ) Notice: Subject to any disclaimer, the term of this patent is extended or adjusted under 35 U.S.C. 154(b) by 141 days.

(21) Appl. No.: 14/890,536

(22) PCT Filed: Feb. 4, 2015

(86) PCT No.: PCT/CN2015/072237
§ 371 (c)(1),
(2) Date: Nov. 11, 2015

(87) PCT Pub. No.: WO2016/029659
PCT Pub. Date: Mar. 3, 2016

(65) Prior Publication Data
US 2016/0291927 A1 Oct. 6, 2016

(30) Foreign Application Priority Data
Aug. 26, 2014 (CN) .......................... 2014 1 0422069

(51) Int. Cl.
H04R 1/10 (2006.01)
H04W 88/04 (2009.01)
G06F 3/16 (2006.01)

(52) U.S. Cl.
CPC .......... *G06F 3/165* (2013.01); *H04R 1/1041* (2013.01); *H04R 1/1091* (2013.01); *H04W 88/04* (2013.01); *H04R 2420/07* (2013.01)

(58) Field of Classification Search
CPC ............ H04N 21/4825; H04N 21/8113; G06F 17/30053; G06F 17/30772; G06F 3/165;
(Continued)

(56) References Cited

U.S. PATENT DOCUMENTS

| 9,129,014 B2 | 9/2015 | Tan |
| 2006/0181963 A1* | 8/2006 | Clayton ................. H04H 20/08 369/24.01 |

(Continued)

FOREIGN PATENT DOCUMENTS

| CN | 101471109 A | 7/2009 |
| CN | 101689941 A | 3/2010 |

(Continued)

*Primary Examiner* — Lewis West
(74) *Attorney, Agent, or Firm* — Ladas & Parry LLP

(57) ABSTRACT

A method and a system for synchronizing functions of a music player in a smart device and a Bluetooth earphone are disclosed. The method includes: transmitting a first play list to a smart device by a Bluetooth earphone; comparing the received first play list with a second play list by the smart device; receiving and transmitting a first control instruction to the smart device by the Bluetooth earphone when the first play list is consistent with the second play list; and transmitting the second play list to the Bluetooth earphone, and receiving and transmitting a second control instruction to the smart device by the Bluetooth earphone, when the first play list is inconsistent with the second play list.

17 Claims, 5 Drawing Sheets

(58) Field of Classification Search
CPC ....... G10H 2240/211; G10H 2240/251; G10H 2240/321; H04M 1/72558; H04R 2227/005; H04R 1/1041; H04R 1/1091; H04R 2420/07; H04W 84/18; H04W 88/04

See application file for complete search history.

(56) References Cited

U.S. PATENT DOCUMENTS

| | | | | |
|---|---|---|---|---|
| 2006/0270395 | A1* | 11/2006 | Dhawan | H04M 1/7253 455/418 |
| 2008/0021777 | A1* | 1/2008 | Mack | G09F 21/04 705/14.1 |
| 2008/0268771 | A1* | 10/2008 | Masuda | H04H 20/61 455/3.01 |
| 2011/0010732 | A1* | 1/2011 | Opdycke | G06Q 30/02 725/10 |
| 2012/0039481 | A1 | 2/2012 | McClain | |
| 2012/0117026 | A1* | 5/2012 | Cassidy | G06F 17/30053 707/634 |
| 2013/0091140 | A1* | 4/2013 | Attwell | H04H 60/06 707/741 |
| 2013/0218961 | A1* | 8/2013 | Ho | G06Q 30/02 709/204 |
| 2013/0275353 | A1* | 10/2013 | Ingrassia, Jr. | H04M 1/72558 706/46 |
| 2013/0322648 | A1* | 12/2013 | Chukka | H04L 65/60 381/77 |
| 2014/0074924 | A1* | 3/2014 | Yim | H04N 21/43637 709/204 |
| 2014/0140674 | A1* | 5/2014 | Jallad | H04N 5/93 386/200 |
| 2015/0188975 | A1* | 7/2015 | Hansen | H04L 67/1068 709/231 |
| 2016/0191599 | A1* | 6/2016 | Stridsman | H04N 21/25841 709/219 |
| 2017/0093999 | A1* | 3/2017 | Shenoy | H04L 67/06 |
| 2017/0147574 | A1* | 5/2017 | Konttinen | G06F 17/30029 |

FOREIGN PATENT DOCUMENTS

| | | |
|---|---|---|
| CN | 102215115 A | 10/2011 |
| CN | 102256007 A | 11/2011 |
| CN | 104183250 A | 12/2014 |
| WO | 2012009595 A1 | 1/2012 |

* cited by examiner

METHOD AND SYSTEM FOR SYNCHRONIZING FUNCTIONS OF MUSIC PLAYER IN SMART DEVICE AND BLUETOOTH EARPHONE

CROSS REFERENCE TO RELATED APPLICATION

This application claims the priority of Chinese Patent Application No. 201410422069.3, filed Aug. 26, 2014 in the SIPO (State Intellectual Property Office of the P.R.C). Further, this application is the National Phase application of International Application No. PCT/CN2015/072237 filed Feb. 4, 2015, which designates the United States. The entire disclosure of each of the above applications is incorporated herein by reference.

BACKGROUND OF THE INVENTION

1. Field of the Invention

The present invention generally relates to a field of mobile communication, and more particularly to a method and a system for synchronizing functions of a music player in a smart device and a Bluetooth earphone.

2. Description of Prior Art

Bluetooth is a wireless technology for supporting short-distance communications (generally within 10 meters) among devices. In Bluetooth technology, wireless information can be exchanged among various devices including mobile phones, PDAs, wireless earphones, notebooks, and associated peripheral devices. For example, when the Bluetooth technology is introduced in a mobile phone and a notebook, a cumbersome connecting cable between the mobile phone and the notebook can be removed and the communication between the mobile phone and the notebook can be established via Bluetooth technology. A printer, a PDA, a desktop computer, a fax machine, a keyboard, a game joystick, or a digital device can be roles of Bluetooth devices. Furthermore, Bluetooth wireless technology provides a common interface for an existing digital network and peripheral devices to construct a private group away from a fixed network. From this, it can be seen that utilizing the Bluetooth technology can successfully simplify the communication among mobile communication terminal devices and can successfully simplify the communication among the devices and the internet. As a result, data transmission is fast and highly effective. A road to wireless communication is widened.

Currently, an application of the Bluetooth which is applied the most widely is a Bluetooth earphone. Portability and wireless operability are characteristics of the Bluetooth earphones. For example, when an earphone is worn, the earphone can be coupled to a smart device and control the smart device to play music. However, the Bluetooth earphones on the market can only remotely execute music playing control (including play, pause, previous, and next) and display a song name of the music currently played. The functions are too simple to satisfy a user's demand.

Consequently, the prior art needs to be further improved.

DISCLOSURE OF THE INVENTION

Technical Problems

Based on the above-mentioned deficiencies in the prior art, an object of the present invention is to provide a method and a system for synchronizing functions of a music player in a smart device and a Bluetooth earphone for a user. The user can implement a play and a control functions via the Bluetooth earphone. The user's demand can be satisfied, and the user experience can be improved.

The present invention utilizes the following technical schemes to solve the technical problems.

A method for synchronizing functions of a music player in a smart device comprises:

Receiving a user's operating instruction and setting up a link under an SPP protocol with the smart device by a Bluetooth earphone;

Acquiring a first play list in the Bluetooth earphone, and encoding the first play list to acquire information of the first play list;

Transmitting the information of the first play list to the smart device by the Bluetooth earphone; receiving the first play list and comparing the first play list with a second play list of the music player in the smart device by the smart device to determine whether the first play list is consistent with the second play list to generate a comparison result;

When the comparison result indicates that the first play list is consistent with the second play list:

Receiving a first control instruction for the first play list by the Bluetooth earphone; and Setting up a link under an AVRCP protocol with the smart device, and transmitting the first control instruction to the smart device by the Bluetooth earphone.

The method for synchronizing the functions of the music player in the smart device further comprises:

When the comparison result indicates that the first play list is inconsistent with the second play list:

Transmitting the second play list to the Bluetooth earphone by the smart device; receiving the second play list by the Bluetooth earphone; and Receiving a user's second control instruction for the second play list and transmitting the second control instruction to the smart device by the Bluetooth earphone.

In the method for synchronizing the functions of the music player in the smart device, before the step of receiving the first play list and comparing the first play list with the second play list of the music player in the smart device by the smart device, the method further comprises:

Receiving the information of the first play list and decoding the information of the first play list to acquire the first play list by the smart device.

In the method for synchronizing the functions of the music player in the smart device, after the step of receiving the first control instruction for the first play list and transmitting the first control instruction to the smart device by the Bluetooth earphone, the method further comprises:

Receiving the first control instruction and analyzing the first control instruction to generate an analyzed result by the smart device; and Playing one or more songs by the smart device when the first control instruction is a play instruction.

In the method for synchronizing the functions of the music player in the smart device, when the first control instruction is a sublist acquiring instruction, the smart device transmits sublists of the first play list to the Bluetooth earphone.

In the method for synchronizing the functions of the music player in the smart device, before the step of receiving the first play list and comparing the first play list with the second play list of the music player in the smart device by the smart device, the method further comprises:

Receiving the information of the first play list and decoding the information of the first play list to acquire the first play list.

In the method for synchronizing the functions of the music player in the smart device, after the step of receiving the user's first control instruction for the first play list and transmitting the first control instruction to the smart device by the Bluetooth earphone, the method further comprises:

Receiving the first control instruction and analyzing the first control instruction to generate an analyzed result by the smart device; and Playing one or more songs by the smart device when the first control instruction is a play instruction.

In the method for synchronizing the functions of the music player in the smart device, when the first control instruction is a sublist acquiring instruction, the smart device transmits sublists of the first play list to the Bluetooth earphone.

A system for synchronizing functions of a music player in a smart device comprises a list transmitting module, a comparing and controlling module, a first instructing module, and a second instructing module.

The list transmitting module is utilized for setting up a link under an SPP protocol with the smart device and transmitting a first play list to the smart device after the Bluetooth earphone receives a user's operating instruction.

The comparing and controlling module is utilized for comparing the first play list with a second play list of the music player in the smart device to determine whether the first play list is consistent with the second play list to generate a comparison result, after the smart device receives the first play list. When the comparison result indicates that the first play list is consistent with the second play list, the first instructing module is initiated. When the comparison result indicates that the first play list is inconsistent with the second play list, the smart device transmits the second play list to the Bluetooth earphone and the second instructing module is initiated.

The first instructing module is utilized for transmitting a user's first control instruction to the smart device after the Bluetooth earphone receives the first control instruction for the first play list.

The second instructing module is utilized for transmitting a user's second control instruction to the smart device after the Bluetooth earphone receives the second play list and receives the second control instruction for the second play list.

In the system for synchronizing the functions of the music player in the smart device, the list transmitting module comprises:

An SPP linking unit utilized for setting up the link under the SPP protocol with the smart device after the Bluetooth earphone receives the user's operating instruction;

A Bluetooth encoding unit utilized for acquiring the first play list in the Bluetooth earphone and encoding the first play list to acquire information of the first play list; and A first transmitting unit utilized for transmitting the information of the first play list to the smart device.

In the system for synchronizing the functions of the music player in the smart device, the comparing and controlling module comprises:

A terminal decoding unit utilized for decoding the information of the first play list to acquire the first play list after the smart device receives the information of the first play list;

A terminal comparing unit utilized for comparing the first play list with the second play list of the music player in the smart device and determining whether the first play list is consistent with the second play list;

A first controlling unit utilized for initiating the first instructing module when the first play list is consistent with the second play list; and A second controlling unit utilized for transmitting the second play list to the Bluetooth earphone and initiating the second instructing module when the first play amended version list is inconsistent with the second play list.

The system for synchronizing the functions of the music player in the smart device, the first instructing module comprises:

A first processing module utilized for analyzing the first control instruction after the smart device receives the first control instruction. When the first control instruction is a play instruction, one or more songs are played. When the first control instruction is a sublist acquiring instruction, the smart device transmits sublists of the first play list to the Bluetooth earphone.

A Bluetooth earphone comprises:

A list transmitting module utilized for receiving a user's operating instruction, setting up a link under an SPP protocol with a smart device, and transmitting a first play list to the smart device, wherein the smart device compares the first play list with a second play list of a music player in the smart device to determine whether the first play list is consistent with the second play list to generate a comparison result, after the smart device receives the first play list; when the comparison result indicates that the first play list is inconsistent with the second play list, the smart device transmits the second play list to the Bluetooth earphone; and A second instructing module utilized for receiving the user's second control list for the second play list and transmitting the second control instruction to the smart device, after the list transmitting module receives the second play list.

The present invention provides a method and a system for synchronizing functions of a music player in a smart device and a Bluetooth earphone. The method comprises the following steps. A Bluetooth earphone receives a user's operating instruction, sets up a link under an SPP protocol with the smart device, and transmits a first play list to the smart device. The smart device receives the first play list, compares the first play list with a second play list in the music player of the smart device, and determines whether the first play list is consistent with the second play list. If yes, the Bluetooth earphone receives a user's first control instruction for the first play list and transmits the first control instruction to the smart device. If no, the second play list is transmitted to the Bluetooth earphone, and the Bluetooth earphone receives the second play list, receives a user's second control instruction for the second play list, and transmits the second control instruction to the smart device. In the present invention, the user can view the information of all songs in the smart device and select one or more of all songs to play and control, so as to be convenient for the user.

BRIEF DESCRIPTION OF THE DRAWINGS

Description of the Drawings

Figure 1:
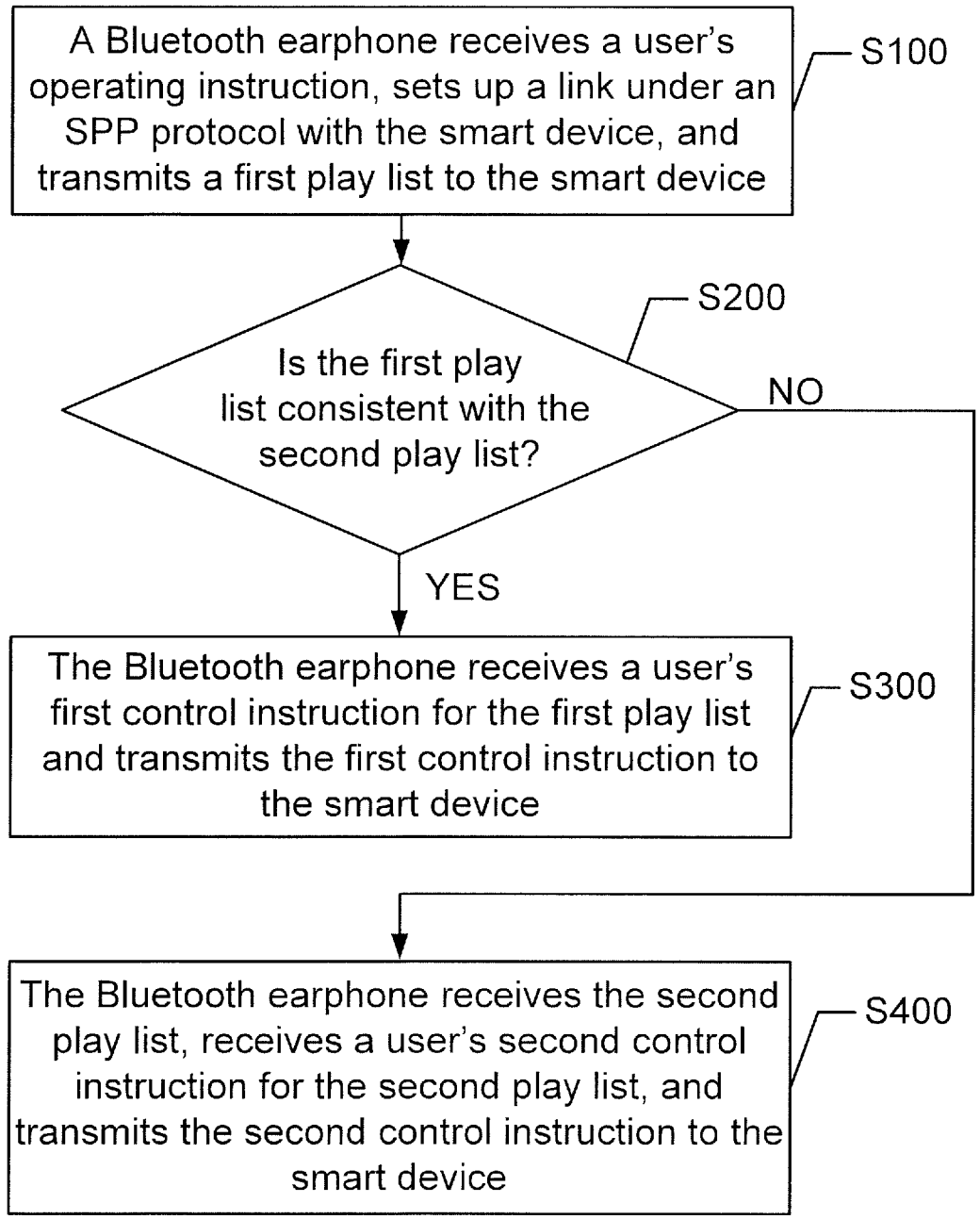

FIG. 1 is a flowchart of a method for synchronizing functions of a music player in a smart device in accordance with a preferred embodiment of the present invention.

Figure 2:
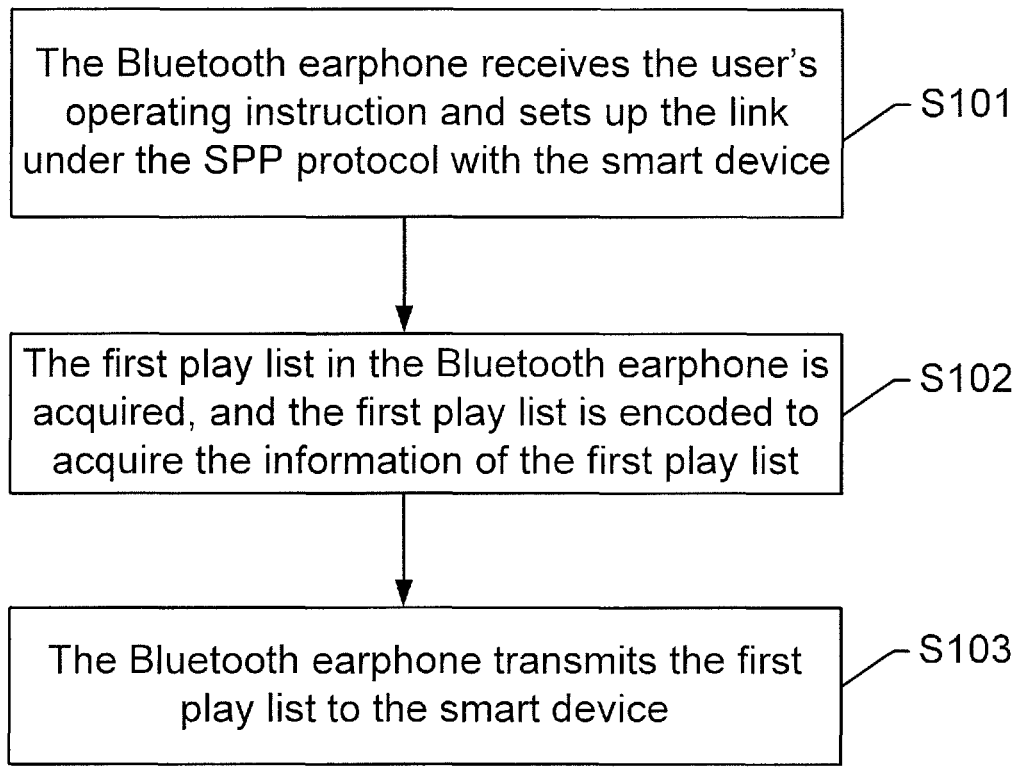

FIG. 2 is a flowchart of transmitting a first play list by a Bluetooth earphone in the method for synchronizing the functions of the music player in the smart device in accordance with a preferred embodiment of the present invention.

Figure 3:
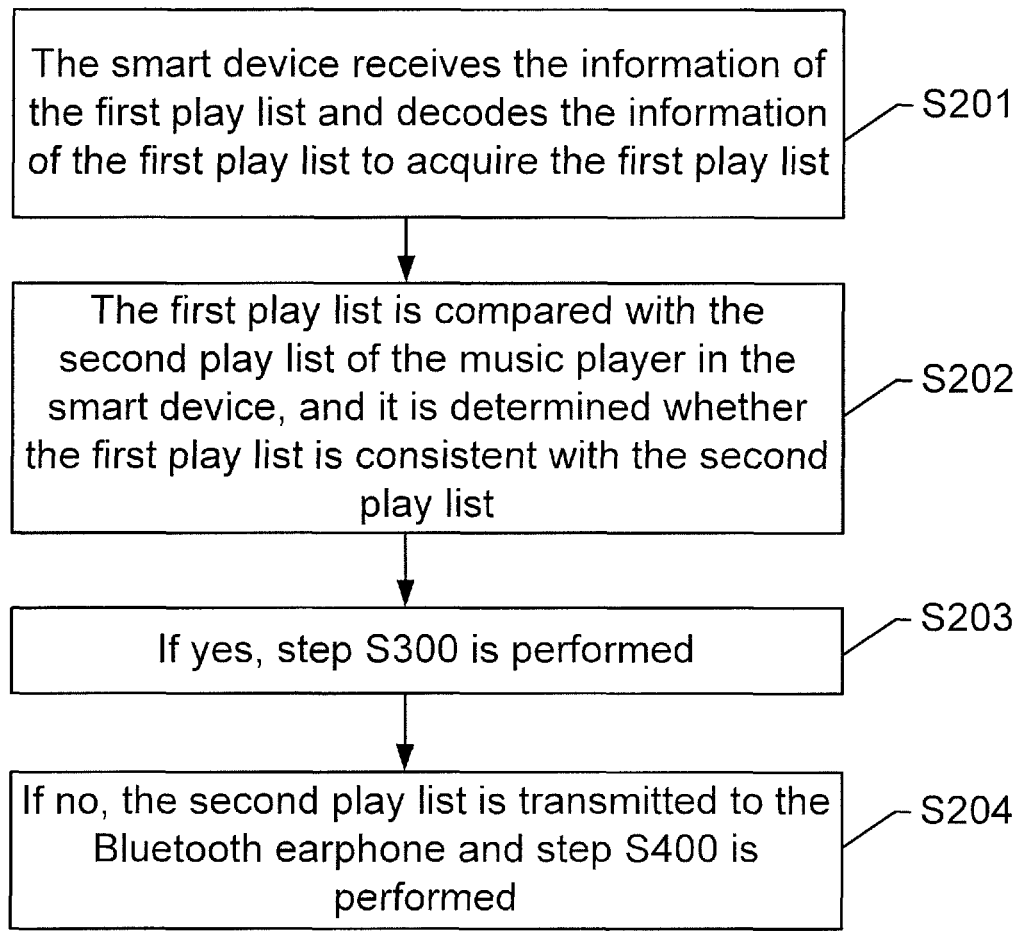

FIG. 3 is a flowchart of comparing and controlling lists in the method for synchronizing the functions of the music player in the smart device in accordance with a preferred embodiment of the present invention.

Figure 4:
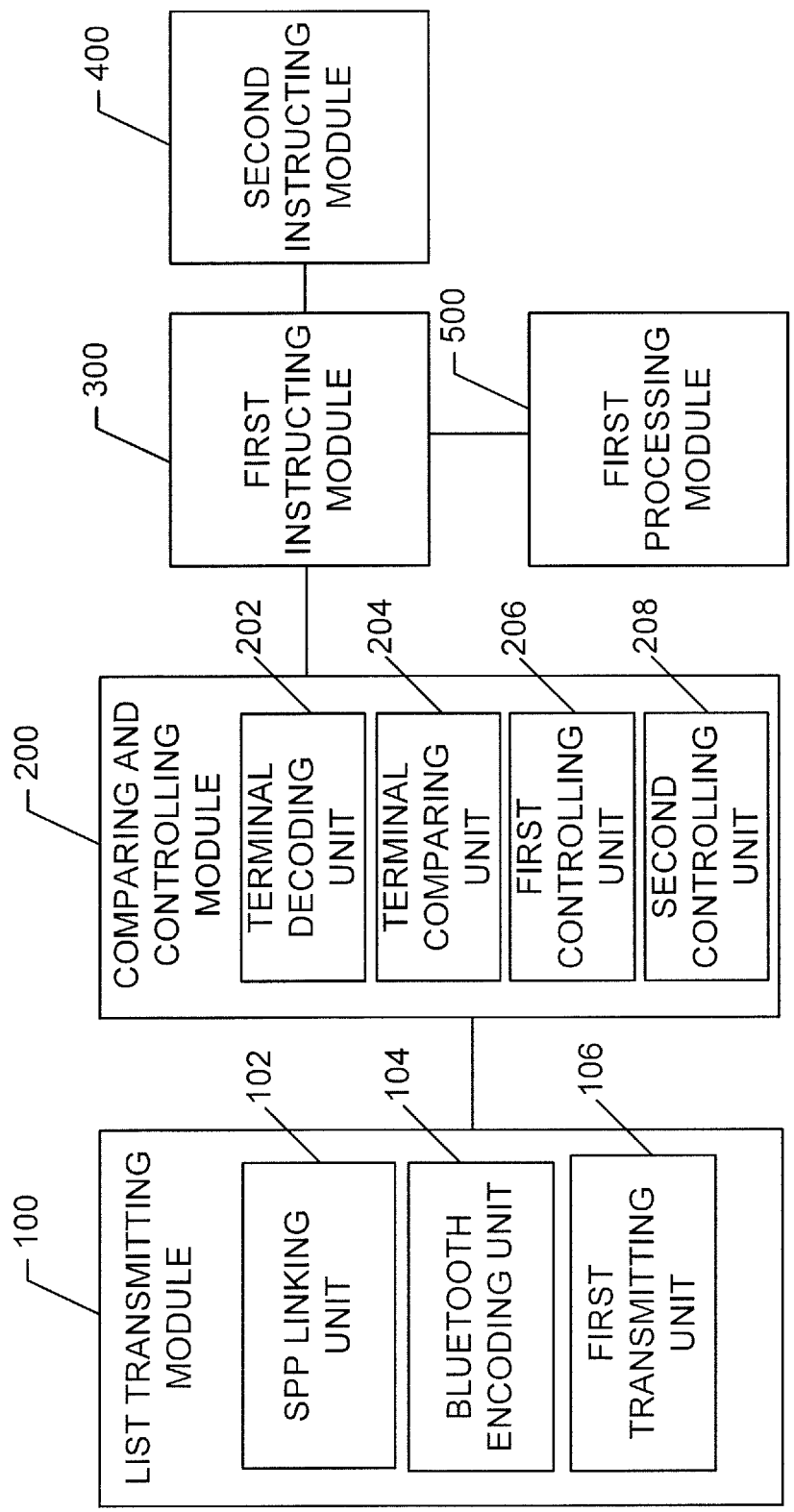

FIG. 4 is a functional block diagram of a system for synchronizing functions of a music player in a smart device in accordance with a preferred embodiment of the present invention.

Figure 5:
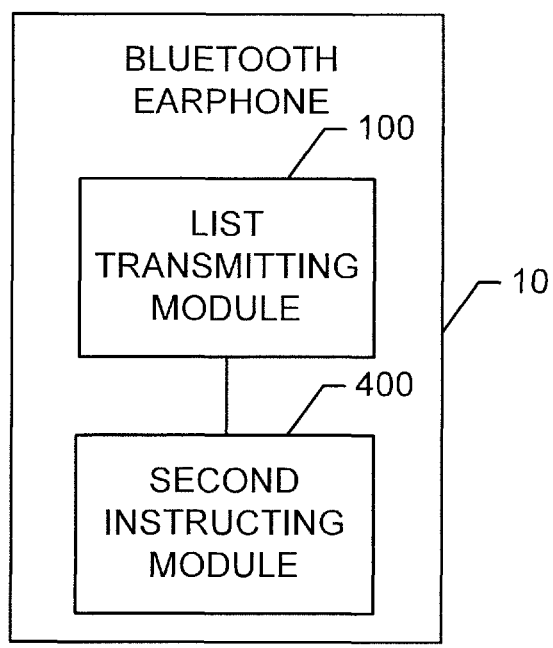

FIG. 5 is a functional block diagram of a Bluetooth earphone in accordance with a preferred embodiment of the present invention.

BEST EMBODIMENT FOR CARRYING OUT THE INVENTION

For a better understanding of the aforementioned content of the present invention, preferable embodiments are illustrated in accordance with the attached figures for further explanation. It should be understood that specific embodiments described herein are merely intended to explain the present invention, but are not intended to limit the present invention.

Please refer to FIG. 1, which is a flowchart of a method for synchronizing functions of a music player in a smart device in accordance with a preferred embodiment of the present invention. As shown in FIG. 1, the method for synchronizing the functions of the music player in the smart device comprises the following steps.

In step S100, a Bluetooth earphone receives a user's operating instruction, sets up a link under a serial port profile (SPP) protocol with the smart device, and transmits a first play list to the smart device.

In the present embodiment of the present invention, data information in the first play list cannot be transmitted between the Bluetooth earphone and the smart device until the link under the SPP protocol is set up between the Bluetooth earphone and the smart device. When the link under the SPP protocol is completed, the first play list which is stored in the Bluetooth earphone is transmitted to the smart device. The first play list includes an album list, a singer list, a list of all songs, and a list of favorite songs. That is, the first play list is just a summary menu and includes four sublists. The Bluetooth earphone stores only the first play list including the four sublists and does not store sublists of the four sublists. Accordingly, the storage of the first play list occupied in the smart device can be significantly decreased.

In step S200, the smart device receives the first play list, compares the first play list with a second play list in the music player of the smart device, and determines whether the first play list is consistent with the second play list. If yes, step S300 is performed. If no, the second play list is transmitted to the Bluetooth earphone, and step S400 is performed.

In step S200, the second play list includes four or more sublists such as an album list, a singer list, a list of all songs, and a list of favorite songs. These sublists include subordinated sublists. For example, when the user starts a KuGou player, four sublists including an album list, a singer list, a list of all songs, and a list of favorite songs are displayed. After the user clicks the album list, album 1, album 2, album 3, and so on, are displayed. After the user clicks the album 1, song names of all songs are displayed. It can be seen that the information included in the second play list is more detailed than that in the first play list.

In step S300, the Bluetooth earphone receives a user's first control instruction for the first play list and transmits the first control instruction to the smart device.

In the embodiment of the present invention, when the first play list is consistent with the second play list, that is, the four sublists included in the first play list are completely consistent with the four sublists included in the second play list, step S300 is performed. Meanwhile, the user operates the Bluetooth earphone to select one sublist in the first play list, for example, an album list. Since sublists of the album list are not stored in the Bluetooth earphone, a first control instruction for acquiring the sublists of the album list is transmitted to the smart device. After the Bluetooth earphone acquires the sublists of the album list, the user selects one of songs to play and a first control instruction for playing the selected song is transmitted to the smart device.

In step 400, the Bluetooth earphone receives the second play list, receives a user's second control instruction for the second play list, and transmits the second control instruction to the smart device.

In the embodiment of the present invention, when the first play list is inconsistent with the second play list, that is, the four sublists included in the first play list are different from the four sublists included in the second play list, step S400 is performed. Meanwhile, the Bluetooth earphone receives the second play list transmitted from the smart device. Then, the user selects one of songs to play, and a second control instruction for playing the selected song is transmitted to the smart device.

In a further embodiment, as shown in FIG. 2, step S100 in which the Bluetooth earphone transmits the first play list specifically comprises the following steps.

In step S101, the Bluetooth earphone receives the user's operating instruction and sets up the link under the SPP protocol with the smart device.

In step S102, the first play list in the Bluetooth earphone is acquired, and the first play list is encoded to acquire the information of the first play list.

In step S103, the Bluetooth earphone transmits the information of the first play list to the smart device.

In the embodiment of the present invention, the first play list is not directly transmitted to the smart device. The first play list is transmitted after being encoded. That is, the first play list is encoded into the information of the first play list, and then the information of the first play list is transmitted. Since the Bluetooth earphone is linked with the smart device via the SPP protocol, the information of the first play list can be transmitted between the Bluetooth earphone and the smart device without damage.

In a further embodiment, as shown in FIG. 3, step S200 for comparing and controlling the lists specifically comprises the following steps.

In step S201, the smart device receives the information of the first play list and decodes the information of the first play list to acquire the first play list.

In step S202, the first play list is compared with the second play list of the music player in the smart device, and it is determined whether the first play list is consistent with the second play list.

In step S203, if yes, step S300 is performed.

In step S204, if no, the second play list is transmitted to the Bluetooth earphone and step S400 is performed.

In the embodiment of the present invention, after the smart device receives the information of the first play list, decodes the information of the first play list into the first play list, and compares the first play list with the second play list. Specifically, the sublists included in the first play list are completely consistent with the sublists included in the second play list, and step S300 is performed. The sublists included in the first play list are different from the sublists included in the second play list, and step S400 is performed.

In a further embodiment, after step S300 and before step S400, the method further comprises the following steps. The smart device receives the first control instruction and analyzes the first control instruction. When the first control instruction is a play instruction, one or more songs are played. When the first control instruction is a sublist acquiring instruction, the smart device transmits the sublists of the first play list to the Bluetooth earphone.

In a further embodiment, in step S300, when the Bluetooth earphone transmits the first control instruction to the smart device, a link under an Audio/Video Remote Control Profile (AVRCP) protocol is set up between the Bluetooth earphone and the smart device. When the Bluetooth monitors that the smart device plays one song, the Bluetooth earphone controls a previous one, a next one, play, and pause of the one song via the AVRCP protocol. The smart device transmits detailed information of the song which is currently played via the AVRCP protocol.

Based on the above-mentioned embodiment, as shown in FIG. 4, the present invention further provides a system for synchronizing functions of a music player in a smart device. The system comprises a list transmitting module 100, a comparing and controlling module 200, a first instructing module 300, and a second instructing module 400.

The list transmitting module 100 is utilized for setting up a link under a serial port profile (SPP) protocol with the smart device and transmitting a first play list to the smart device after the Bluetooth earphone receives a user's operating instruction. The embodiment is described above.

The comparing and controlling module 200 is utilized for comparing the first play list with a second play list in the smart device after the smart device receives the first play list. When the first play list is consistent with the second play list, the first instructing module 300 is initiated. When the first play list is inconsistent with the second play list, the second play list is transmitted to the Bluetooth earphone and the second instructing module 400 is initiated. The embodiment is described above.

The first instructing module 300 is utilized for transmitting a user's first control instruction to the smart device after the Bluetooth earphone receives the first control instruction for the first play list. The embodiment is described above.

The second instructing module 400 is utilized for transmitting a user's second control instruction to the smart device after the Bluetooth earphone receives the second play list and receives the second control instruction for the second play list. The embodiment is described above.

In a further embodiment, in the system for synchronizing the functions of the music player in the smart device, the list transmitting module 100 specifically comprises the following units.

An SPP linking unit 102 is utilized for setting up the link under the SPP protocol with the smart device after the Bluetooth earphone receives the user's operating instruction. The embodiment is described above.

A Bluetooth encoding unit 104 is utilized for acquiring the first play list in the Bluetooth earphone and encoding the first play list to acquire information of the first play list. The embodiment is described above.

A first transmitting unit 106 is utilized for transmitting the information of the first play list to the smart device. The embodiment is described above.

In a further embodiment, in the system for synchronizing the functions of the music player in the smart device, the comparing and controlling module 200 specifically comprises the following units.

A terminal decoding unit 202 is utilized for decoding the information of the first play list to acquire the first play list after the smart device receives the information of the first play list. The embodiment is described above.

A terminal comparing unit 204 is utilized for comparing the first play list with the second play list of the music player in the smart device and determining whether the first play list is consistent with the second play list. The embodiment is described above.

A first controlling unit 206 is utilized for initiating the first instructing module 300 when the first play list is consistent with the second play list. The embodiment is described above.

A second controlling unit 208 is utilized for transmitting the second play list to the Bluetooth earphone and initiating the second instructing module 400 when the first play list is inconsistent with the second play list. The embodiment is described above.

In a further embodiment, the system for synchronizing the functions of the music player in the smart device further comprises the following module.

A first processing module 500 is utilized for analyzing the first control instruction after the smart device receives the first control instruction. When the first control instruction is a play instruction, one or more songs are played. When the first control instruction is a sublist acquiring instruction, the smart device transmits the sublists of the first play list to the Bluetooth earphone. The embodiment is described above.

In a further embodiment, in the system for synchronizing the functions of the music player in the smart device, after the Bluetooth earphone transmits the first control instruction to the smart device, a link under an Audio/Video Remote Control Profile (AVRCP) protocol is set up between the Bluetooth earphone and the smart device by the first instructing module 300. The embodiment is described above.

Based on the above-mentioned embodiment, as shown in FIG. 5, the present invention further provides a Bluetooth earphone. The Bluetooth earphone 10 comprises the list transmitting module 100 and the second instructing module 400.

The list transmitting module 100 is utilized for receiving the user's operating instruction, setting up the link under the SPP protocol with the smart device, and transmitting the first play list to the smart device.

The smart device receives the first play list and compares the first play list with the second play list of the music player in the smart device. The smart device determines whether the first play list is consistent with the second play list. If no, the second play list is transmitted to the Bluetooth earphone. The embodiment is described above.

The second instructing module 400 is utilized for receiving the user's second control list for the second play list and transmitting the second control instruction to the smart device after the list transmitting module 100 receives the second play list. The embodiment is described above.

In summary, the present invention provides a method and a system for synchronizing functions of a music player in a smart device and a Bluetooth earphone. The method comprises the following steps. A Bluetooth earphone receives a user's operating instruction, sets up a link under an SPP protocol with the smart device, and transmits a first play list to the smart device. The smart device receives the first play list, compares the first play list with a second play list in the music player of the smart device, and determines whether the first play list is consistent with the second play list. If yes, the Bluetooth earphone receives a user's first control instruction for the first play list and transmits the first control instruction to the smart device. If no, the second play list is transmitted to the Bluetooth earphone, and the Bluetooth earphone receives the second play list, receives a user's second control instruction for the second play list, and transmits the second control instruction to the smart device. In the present invention, the user can view the information of all songs in the smart device and select one or more of all songs to play and control, so as to be convenient for the user.

As is understood by a person skilled in the art, the foregoing preferred embodiments of the present invention are illustrative rather than limiting of the present invention. It is intended that various modifications and similar arrangements are to be included within the spirit and scope of the appended claims, the scope of which should be accorded the broadest interpretation so as to encompass all such modifications and similar structures.

What is claimed is:

1. A method for synchronizing functions of a music player in a smart device comprising a processor and a memory comprising a plurality of program instructions executable by the processor, comprising:
   using the processor to execute the plurality of program instructions to receive a user's operating instruction, set up a first link with the smart device, and transmit a first play list to the smart device by a Bluetooth earphone;
   using the processor to execute the plurality of program instructions to compare the first play list with a second play list in the music player of the smart device and determine whether the first play list is same as the second play list by the smart device; and
   if the first play list is same as the second play list, using the processor to execute the plurality of program instructions to receive a user's first control instruction for the first play list and transmit a first control instruction to the smart device by the Bluetooth earphone;
   if the first play list is not same as the second play list, using the processor to execute the plurality of program instructions to transmit the second play list to the Bluetooth earphone by the smart device, receive a user's second control instruction for the second play list, and transmit a second control instruction to the smart device by the Bluetooth earphone for playing a selected song in the second play list by the smart device.

2. The method for synchronizing the functions of the music player in the smart device of claim 1, wherein before the step of using the processor to execute the plurality of program instructions to receive the user's first control instruction for the first play list and transmit the first control instruction to the smart device by the Bluetooth earphone, the method further comprises:
   using the processor to execute the plurality of program instructions to set up a second link under a second protocol with the smart device.

3. The method for synchronizing the functions of the music player in the smart device of claim 2, wherein the second link is a link of an audio/video remote control profile (AVRCP) protocol.

4. The method for synchronizing the functions of the music player in the smart device of claim 1, wherein the step of using the processor to execute the plurality of program instructions to receive the user's operating instruction, set up the first link with the smart device, and transmit the first play list to the smart device by the Bluetooth earphone specifically comprises:
   using the processor to execute the plurality of program instructions to encode the first play list into first play list information by the Bluetooth earphone; and
   using the processor to execute the plurality of program instructions to transmit me first play list information to the smart device Bluetooth headset.

5. The method for synchronizing the functions of the music player in the smart device of claim 4, wherein before the step of using the processor to execute the plurality of program instructions to compare the first play list with the second play list in the music player of the smart device and determine whether the first play list is same as the second play list by the smart device, the method further comprises:
   using the processor to execute the plurality of program instructions to decode the first play list information to acquire the first play list by the smart device.

6. The method for synchronizing the functions of the music player in the smart device of claim 4, wherein after the step of using the processor to execute the plurality of program instructions to receive the user's first control instruction for the first play list and transmit the first control instruction to the smart device by the Bluetooth earphone, the method further comprises:
   using the processor to execute the plurality of program instructions to analyze the first control instruction by the smart device.

7. The method for synchronizing the functions of the music player in the smart device of claim 6, wherein when the first control instruction is a play instruction, one or more songs are played.

8. The method for synchronizing the functions of the music player in the smart device of claim 6, wherein when the first control instruction is a sublist acquiring instruction, the smart device transmits sublists of the first play list to the Bluetooth headset.

9. The method for synchronizing the functions of the music player in the smart device of claim 1, wherein the first link is a link of a serial port profile (SPP) protocol.

10. A system for synchronizing functions of a music player in a smart device comprising a processor and a memory comprising a plurality of program instructions executable by the processor, comprising:
   a list transmitting module configured to cause the processor to set up a first link between a Bluetooth earphone and the smart device and transmit a first play list to the smart device after the Bluetooth earphone receives a user's operating instruction;
   a comparing and controlling module configured to cause the processor to compare the first play list with a second play list in the smart device and determine whether the first play list is same as the second play list by the smart device after the smart device receives the first play list; and
   if the first play list is same as the second play list, a first instructing module configured to cause the processor to transmit a user's first control instruction to the smart device after the Bluetooth earphone receives the first control instruction for the first play list;
   if the first play list is not same as the second play list, a second instructing module utilized for transmitting configured to cause the processor to transmit a user's second control instruction to the smart device by the Bluetooth earphone for playing a selected song in the second play list by the smart device after the Bluetooth earphone receives the second play list and receives the second control instruction for the second play list.

11. The system for synchronizing the functions of the music player in the smart device of claim 10, wherein the list transmitting module at least comprises:
- a Bluetooth encoding unit configured to cause the processor to acquire the first play list in the Bluetooth earphone and encode the first play list into first play list information; and
- a first transmitting unit configured to cause the processor to transmit the first play list information to the smart device.

12. The system for synchronizing the functions of the music player in the smart device of claim 11, wherein the comparing and controlling module at least comprises:
- a terminal decoding unit configured to cause the processor to decode the first play list information to acquire the first play list after the smart device receives the information of the first play list.

13. The system for synchronizing the functions of the music player in the smart device of claim 10, further comprising:
- a first processing module configured to cause the processor to analyze the first control instruction after the smart device receives the first control instruction.

14. The system for synchronizing the functions of the music player in the smart device of claim 13, wherein when the first control instruction is a play instruction, one or more songs are played.

15. The system for synchronizing the functions of the music player in the smart device of claim 13, wherein when the first control instruction is a sublist acquiring instruction, the smart device transmits sublists of the first play list to the Bluetooth earphone.

16. The system for synchronizing the functions of the music player in the smart device of claim 10, wherein the first link is a link of a serial port profile (SPP) protocol.

17. A Bluetooth earphone, comprising:
- a list transmitting module utilized for setting up a link between the Bluetooth earphone and a smart device and transmitting a first play list to the smart device after the Bluetooth earphone receives a user's operating instruction, wherein the smart device compares the first play list with a second play list of a music player in the smart device to determine whether the first play list is same as the second play list to generate a comparing result, after the smart device receives the first play list; when the comparison result indicates that the first play list is not same as the second play list, the smart device transmits the second play list to the Bluetooth earphone; and
- an instructing module utilized for receiving the user's second control list for the second play list and transmitting a control instruction to the smart device, after the list transmitting module receives the second play list.

* * * * *